UNITED STATES PATENT OFFICE.

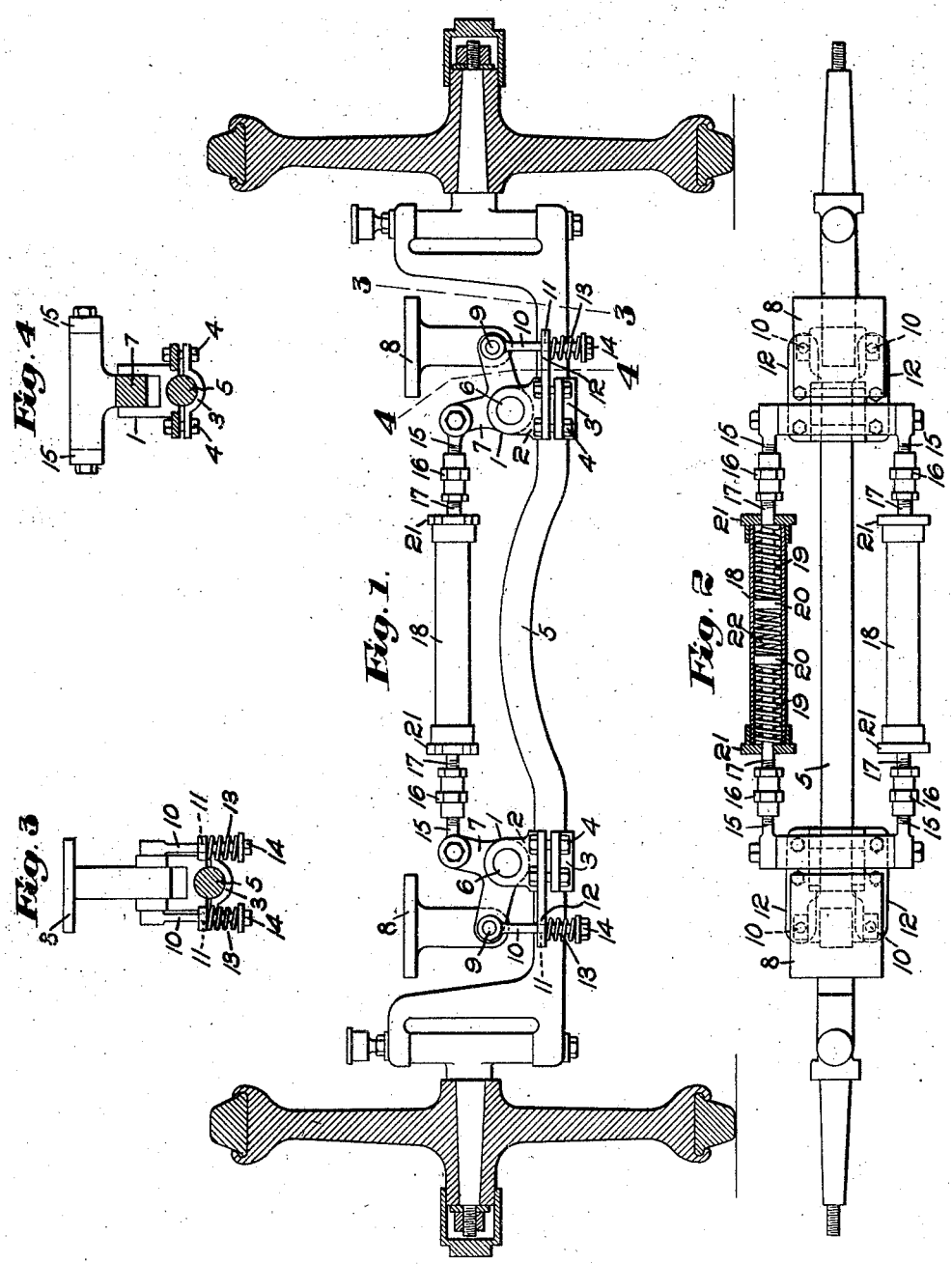

ARSENE ZEPPELIN, OF BROOKLINE, MASSACHUSETTS.

SHOCK-ABSORBER.

1,037,404.   Specification of Letters Patent.   Patented Sept. 3, 1912.

Application filed November 17, 1911. Serial No. 660,879.

*To all whom it may concern:*

Be it known that I, ARSENE ZEPPELIN, a citizen of the United States, and a resident of Brookline, county of Norfolk, and State of Massachusetts, (whose post-office address is 30 Davis avenue, Brookline, Massachusetts,) have invented an Improvement in Shock-Absorbers, of which the following description, in connection with the accompanying drawings, is a specification, like characters on the drawings representing like parts.

My invention relates to shock absorbers for vehicles, and aims to provide an improved device of this character which will be an improvement upon and much less expensive to construct than similar devices now in use for that purpose, and which will be also a satisfactory substitute for the pneumatic tires as well, now so generally used.

In the drawings, Figure 1 is a front elevation of my improved shock absorber, Fig. 2 is a plan thereof, partly in section. Fig. 3, a vertical cross section on the line 3—3, Fig. 1, viewed from the right, and Fig. 4, a vertical cross section on the line 4—4, Fig. 1, viewed from the right.

Referring to Fig. 1, my improved shock absorber is shown as comprising cushion members, and supports therefor, so disposed as to act angularly relative to each other and positioned between the axle and the vehicle body, and herein comprises, first, supports 1, each in the form of a clip or clamp comprising an upper member 2 and an opposed and coöperating lower locking member 3 adapted to be secured in any suitable manner, as by bolts and nuts 4, to an axle 5. These clamping members 2 and 3 may be fashioned to permit them to engage either a round axle or one of different shape, as may be desired. Of course the axle may be constructed with the supports integral thereon, if desired. The upper clamping member 2 may be extended upwardly, Fig. 1, to form one or more bearings for a pivot member, as a pin 6, which serves to pivotally secure to said member 2 a spring actuating and spring seat carrying member, as a bell crank lever 7, the upright arm of which is shown as and preferably is shorter than the laterally extended arm. A spring carrying vehicle supporting block or seat 8 is movably secured to the lower end of said lever as by a pin 9. Depending also from either end of the pin 9 is a cushioning device shown herein as a link 10, extended through an aperture 11 in a spring supporting plate or seat 12 on the member 3, and which acts as a seat for a spring 13, coiled about the lower portion of said link 10 and interposed between said seat 12 and the opposed seat and nut 14 on the end of said link. The upper end, see Fig. 2, of each lever 7 is yieldingly connected with the corresponding end of a similar lever similarly positioned relative to the axle at or near the opposite end thereof and is shown herein as pivotally secured thereto, preferably by a plurality of links 15. One end of each link 15 is herein threaded to receive thereon a turn-buckle 16, by means of which said link is adjustably secured to a piston 17 in a spring barrel 18, preferably positioned above and substantially parallel with the axle.

Within the barrel 18, Fig. 2, each piston 17 has coiled about it a spring 19, which is interposed between a nut or plate 20 on the end of said piston and a cap or head 21 of said barrel forming seats for said spring. The plates 20 may be positioned within said barrel side by side, and abutting one against the other, or I may, and preferably do, interpose between said plates a cushion member or device as a spring 22, which serves to reinforce the two springs 19 and also acts as a cushion member between said springs. By the use of this spring 22 the springs 19 may be retained under less compression within the barrel, and such an arrangement results in a more sensitive and delicate adjustment of said springs, which also causes them to respond more readily to any unevenness in the road than they would otherwise do. The body being mounted on springs secured in turn to the seats 8, it will be obvious that the car body will be suspended by the springs 19, said springs acting as cushion members to take up any shock that tends to lower the car, and also to limit such movement of the car, and in connection with the springs 13 and spring 22, act as cushion members to take up any shock tending to raise the vehicle body, and also to limit such movement.

The above described shock absorber may be applied to either the front or rear axle of a vehicle with equal facility, is simple in arrangement and comparatively inexpensive to construct. Doubtless modifications of my invention may be devised without departing from the spirit and scope thereof as described and claimed herein.

Claims:

1. Shock absorbing means for vehicles comprising lever supports adapted to be secured to the axle, vehicle carrying levers mounted on said supports, upright spring members on said supports and connected to said levers, said spring members acting to cushion the movement of one arm of each of said levers in a direction substantially upright relative to the axle, and opposed spring members connecting, and acting to cushion the movement of, one arm of each of said levers in a lateral direction.

2. Shock absorbing means for vehicles comprising a plurality of lever supports adapted to be secured to the axle, bell crank levers mounted in said supports, a spring seat on each of said supports, a spring carrying link depending from the longer lateral arm of each lever, a spring on said link seated against said spring seat a vehicle carrying seat carried by each lever, links secured to the shorter of said lever arms, oppositely disposed spring seats carried by said links, springs seated thereon in substantial relative alinement, a spring barrel for said springs constituting seats for the springs, a reinforcing spring interposed between said first-named springs, whereby downward movement of the vehicle causes lateral movement of said springs, and lateral movement of said shorter lever arms to a less degree than the movement of said first-named lever arms.

3. Shock absorbing means for vehicles comprising axle clips, bell crank levers pivotally mounted on said clips, spring members connected with said levers to control the upward movement thereof, and a plurality of resilient members operatively connected and positioned end-wise relatively to each other and substantially parallel to the axle to control the lateral motion of said levers.

4. Shock absorbing means for vehicles, comprising an axle, clips thereon, levers mounted in said clips, vehicle spring seats on said levers and springs arranged to yield at substantially right angles to each other to control the movements of said spring seats.

5. Shock absorbing means for vehicles comprising clips, levers mounted thereon, springs adapted to regulate the movement of said levers in one direction and oppositely acting springs mounted in a spring case suspended between and connecting said levers and adapted to regulate the movement of said levers in a direction angular to said first named direction.

6. Shock absorbing means for vehicles comprising lever supports adapted to be secured to the axle, levers, the two arms of which are of unequal length, mounted thereon, vehicle carrying members carried by said levers, springs for controlling the movement of said levers in one direction and a plurality of bodily movable springs connecting said levers.

7. Shock absorbing means for vehicles comprising lever supports adapted to be secured to the axle, vehicle carrying levers thereon, upright spring members on said supports connected to said levers and acting to cushion the movement of one arm of said levers in a direction substantially parallel with the axle, and opposed spring members connecting, and acting to cushion the movement of one arm of each of said levers in a substantially vertical direction.

In testimony whereof, I have signed my name to this specification, in the presence of two subscribing witnesses.

ARSENE ZEPPELIN.

Witnesses:
EVERETT S. EMERY,
ROBERT H. KAMMLER.